United States Patent [19]

Bambauer et al.

[11] Patent Number: 4,623,029
[45] Date of Patent: Nov. 18, 1986

[54] WEIGHING SYSTEM FOR VEHICLES WITH TEMPERATURE AND INCLINOMETER CORRECTION

[75] Inventors: Boyd R. Bambauer, 176 Geyer Rd., Santa Cruz, Calif. 95066; Donald H. Dunkle, Scotts Valley; Steve Loscutoff, San Jose, both of Calif.

[73] Assignees: Oceanside Electronics; Boyd R. Babauer, both of San Francisco, Calif.

[21] Appl. No.: 768,122

[22] Filed: Aug. 22, 1985

[51] Int. Cl.⁴ .................... G01G 19/08; G01G 3/14
[52] U.S. Cl. ................................ 177/137; 177/210 R
[58] Field of Search .................. 177/136, 137, 210 R, 177/226–228

[56] References Cited

U.S. PATENT DOCUMENTS 3,428,139  2/1969  Nolan ............................ 177/137
3,508,623  4/1970  Greenstein .................... 177/137
3,812,345  5/1974  Stone ........................ 177/210 R X
4,312,042  1/1982  Bateman ...................... 177/136 X Primary Examiner—George H. Miller, Jr.

[57] ABSTRACT

A weighing system is provided which measures the weight of a vehicle such as a trailer or a tractor-trailer. A pair of ultrasonic transducers and reflectors are mounted on each axle in enclosed cylinders, the opposite end of each cylinder being connected to the frame of the tractor or trailer. A temperature sensor is provided within each cylinder. The vertical displacement of the frame relative to the axle is sensed by pulsing each of the transducers and measuring the time for the signal to be reflected, compensating for temperature within each cylinder. The signals are added together to produce a net total weight corrected for any incline on which the tractor-trailer stands when weighed and also correcting for temperatures sensed within each cylinder.

4 Claims, 6 Drawing Figures 4,623,029

WEIGHING SYSTEM FOR VEHICLES WITH TEMPERATURE AND INCLINOMETER CORRECTION

BRIEF SUMMARY

This invention relates generally to weighing systems for vehicles as particularly for over the highway vehicles such as trucks and tractor-trailers.

In particular, this invention relates to a weighing system which accurately determines the weight of a vehicle as it is being loaded, with the capability of correcting for any incline on which the tractor-trailer may be standing as it is being weighed.

Systems known in the art include ultrasound systems shown in U.S. Pat. Nos. 3,508,623 and 3,428,139, which systems do not compensate for the tractor-trailer standing on uneven ground, which do not correct for temperature variations in the transducers and which do not enclose the transducers and reflectors to protect them from the elements.

A primary object of the invention is to provide a weighing system for tractor-trailers that gives instantaneous readouts of total weight compensated for temperature and compensated for inclined terrain upon which the tractor-trailer is standing.

A further object of the invention is to instantaneously weigh the load borne by any axle of a tractor-trailer combination, compensated for uneven terrain and temperature.

A further object of the invention is to provide an ultrasonic weighing system for tractor-trailers which is extremely rugged and in which the critical elements are protected from the weather and from debris. Further objects and advaantages will become apparent to those skilled in the art from the following description and drawings in which:

DETAILED DESCRIPTION OF THE DRAWINGS

Figure 1:
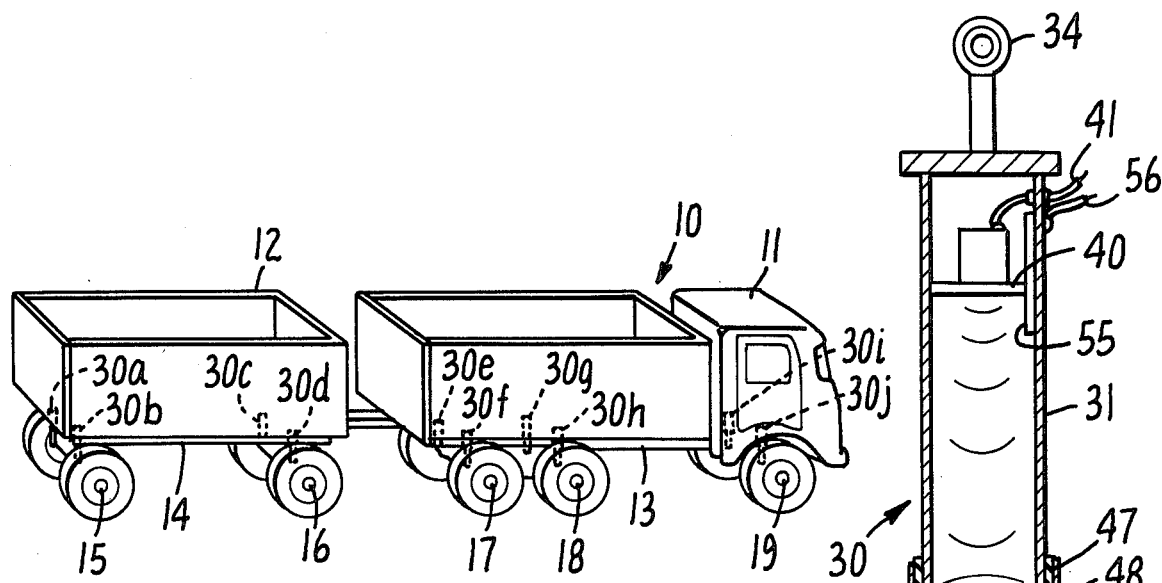
FIG. 1 is a perspective view of a typical tractor-trailer combination representative of vehicles to which the invention applies.

Referring to FIG. 1, the tractor-trailer combination shown generally as 10 includes tractor 11 and trailer 12, having frames 13 and 14 respectively. Trailer 12 has a pair of axles 15 and 16. Tractor 11 has axles 17, 18 and 19. As shown best in FIG. 2, axle 15 has a pair of leaf springs 20 and 21 which suspend frame 14 from axle 15.

Figure 3:
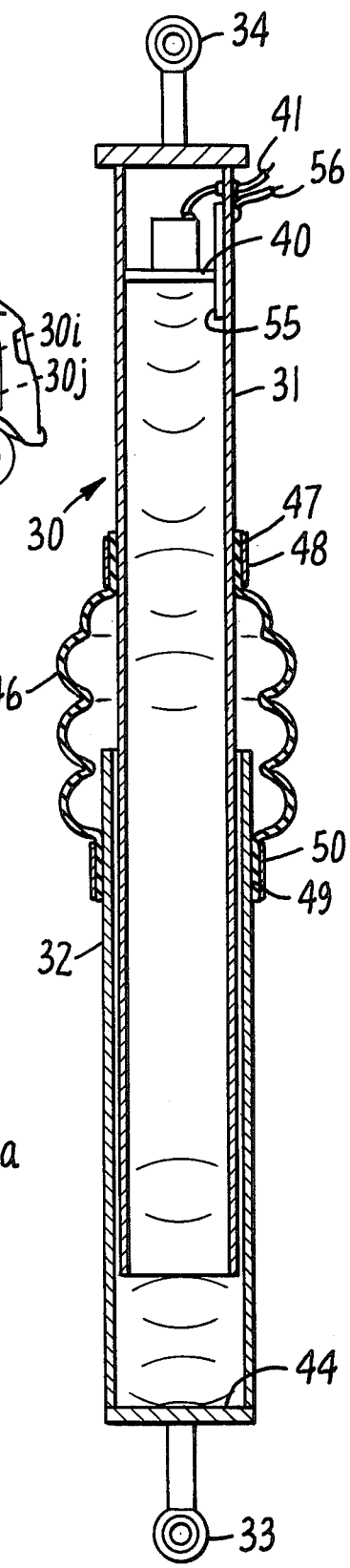
FIG. 3 is a sectional view of a typical cylinder.

As shown in FIG. 3, a cylinder means shown generally as 30 has two telescoping support tubes 31 and 32 which slide vertically with respect to each other. In the embodiment shown in FIG. 1, ten identical cylinder means are incorporated, shown as 30a–30j. The enclosed cylinder means 30 shown in FIG. 3 is representative of each of the ten enclosed cylinder means 30a–30j shown in FIG. 1.

Figure 2:
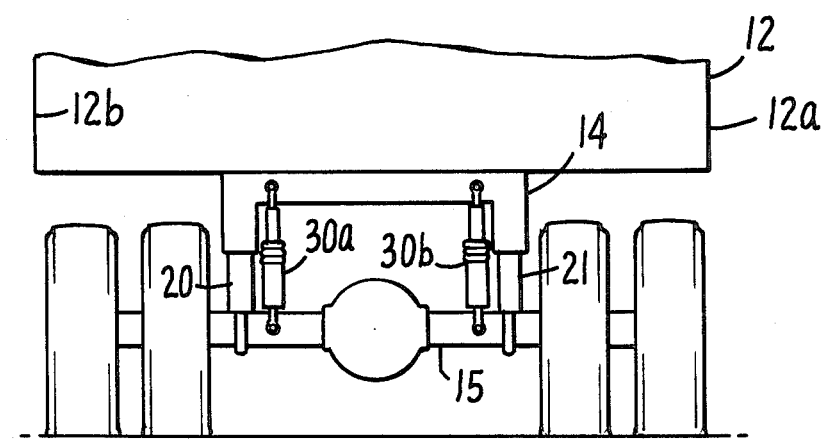
FIG. 2 is an elevational view looking at the rear of the trailer.

As shown in FIG. 2, cylinder means 30a and 30b are connected to axle 15 at their lower ends and are connected to frame 14 at their upper ends. Ball joint tie rod ends 33 and 34 connect the lower and upper support tubes 32 and 31 to the axle and frame respectively of the tractor-trailer 10.

Ultrasonic transducer means 40 is mounted within upper telescoping support tube 31 and is connected to the analyzer described below by coaxial cable 41.

Ultrasonic reflector means 44 is the flat surface of the end of lower support tube 32.

A weather-proof boot 46 is connected at its upper end 47 to upper support tube 31 by strap 48. Similarly, lower end 49 of weather-proof boot 46 is attached to lower support tube 32 by strap 50. Boot 46 is made of flexible and resilient material such as rubber which serves to insulate the interior of cylinder means 30 from the elements and road debris.

Temperature sensor 55 is mounted in upper support tube 31 and is connected to the analyzer described below by coaxial cable 56.

Referring to FIG. 2, if trailer 12 is standing on an incline such that the right-hand edge 12a is higher than the left-hand edge 12b of trailer 12, leaf spring 20 will carry more weight than leaf spring 21. By using two cyliners 30a and 30b, the effect of the incline is automatically cancelled because cylinder 30a will measure the increased weight carried by spring 20 and cylinder 30b will sense the decreased weight carried by spring 21. Similarly, referring to FIG. 1, if trailer 12 is on an incline such that axle 16 is at a greater elevation than axle 15, axle 15 will be carrying a greater percentage of the load contained within trailer 12 than axle 16. Cylinders 30a and 30b will sense the greater weight caused by the incline and cylinders 30c and 30d will sense a correspondingly smaller load carried by axle 16 due to the incline. Therefore, by mounting a cylinder adjacent each spring of the tractor-trailer combination, the effect of sensing the overall weight when the tractor-trailer 10 is standing on incline terrain is automatically corrected by the present invention.

Figure 4:
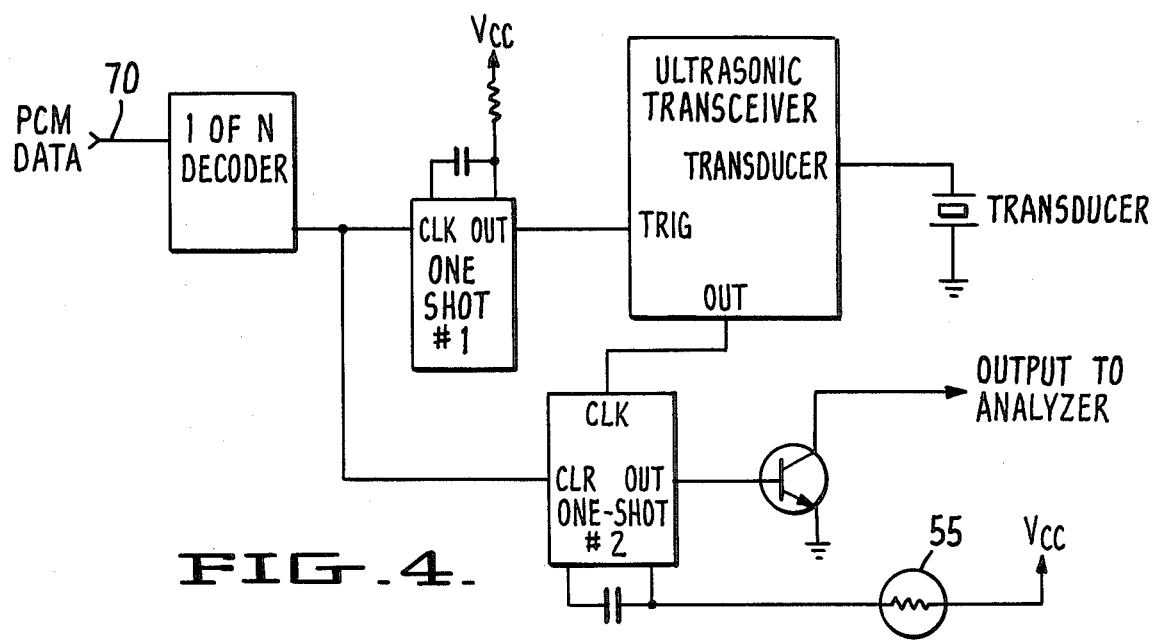
FIGS. 4 and 5 represent a schematic representation of the converter operation.
Figure 5:
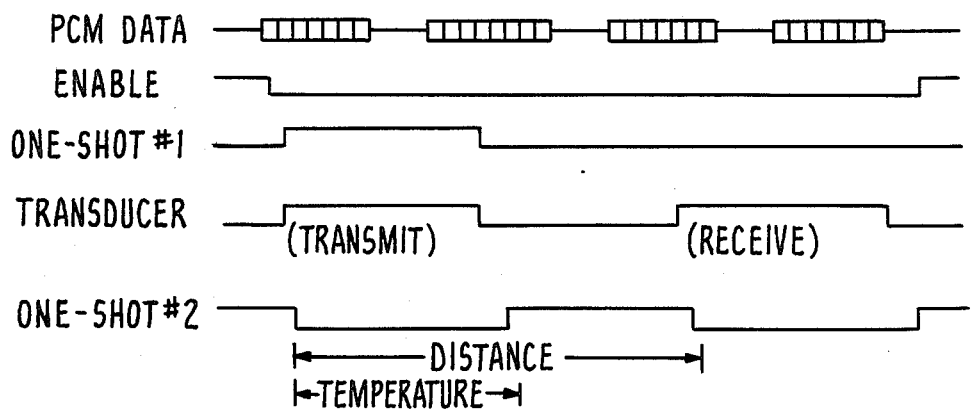
Figure 6:
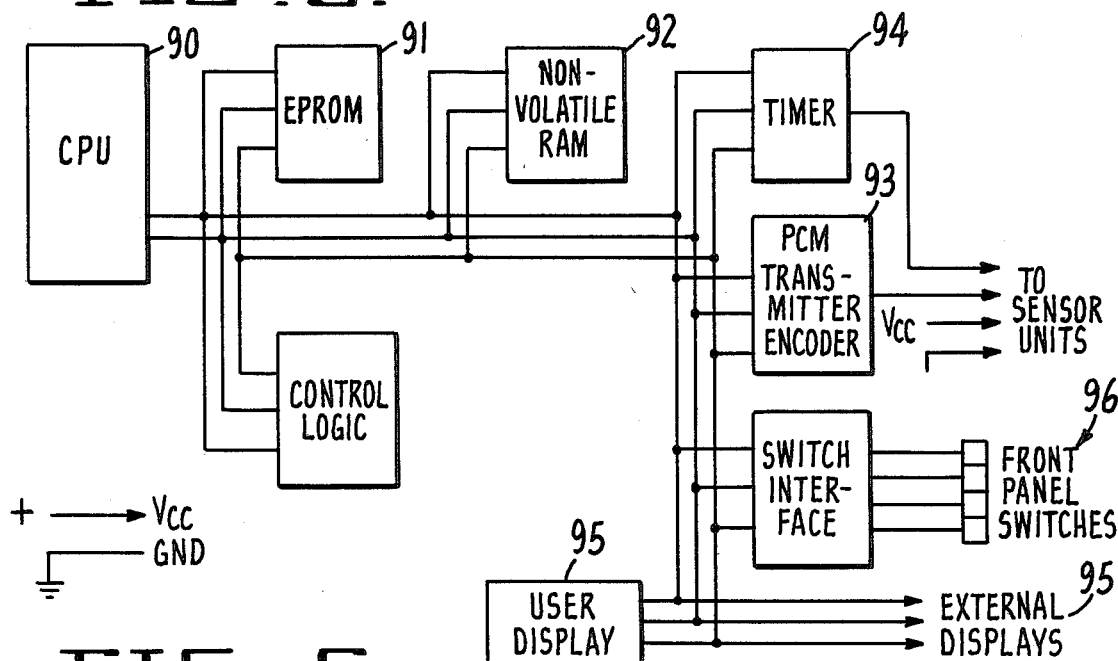
FIG. 6 is a schematic representation of the data analyzer.

FIGS. 4 and 5 schematically represent the converter operation. A command signal is received at the PCM (pulse code modulated) data input 70 and decoded for 1 of N addresses. Upon detection of a valid signal the enable line output of the detector enables the output circuit of one-shot #2, preventing false output signals received from the transducer 40 should it be exposed to mechanical or electrical energy which would cause false triggering of the output of one-shot #2.

The timed enable pulse generated by one-shot #1 is used to trigger the transceiver's transmitter. The transceiver upon receiving an enable pulse generates an ultrasonic signal proportional to the enable pulse time, and upon receiving a reflected signal from the transceiver's receiver circuit, amplies, detects and waveshapes a detected signal proportional to the received signals timed.

This signal drives one-shot #2. At the time of triggering the temperature sensor 55 sets a value resistance proportional to the ambient temperature in support tube 31. After a period of time which represents the temperature (shown in FIG. 5) the one-shot resets and is triggered again by the received pulse from the transceiver circuit of the second falling edge of one-shot #2's output gives the total distance of separation between transducer 40 and the reflective end-cap 44 of support tube 32.

FIG. 5 shows the schematic of the data analyzer. The analyzer is composed of several basic components, including EPROM and non-volatile RAM memory, a microprocessor, control logic, a timer, a PCM transmitter, user interface and displays to indicate function of operation and weight of the analyzed load. The microprocessor 90 is responsible for controlling all aspects of the operation. The program which the microprocessor uses is retained in the eprom memory 91. The non-volatile memory 92 is used to retain important information determined during the calibration cycle and from the systems daily operation.

The PCM transmitter 93 is used to control and activate the sensors of each cylinder one at a time under microprocessor control. The timer 94 is used to time the received data from each sensor and to generate a hexidecimal equivalent number for both the temperature and distance, which numbers are integrated to correct for any inclined terrain on which the tractor-trailer is standing when weighed.

By using the PCM transmitter, a reduction of the cabling necessary to obtain the data from the sensors is reduced. In the present system, two of the cables conductors are used to supply power to the cylinders. One conducter is used by the pcm transmitter to communicate with each sensor an the other is used to communicate each sensor to the timer in the anaylzer.

The analyzer receives its power from the vehicle's battery and is converted to the appropriate voltage internally in the analyzer.

The display 95 is located in the analyzer's cabinet within the cab of the tractor 11 to indicate the loaded weight. An external display 95 is usually mounted in clear view and can be mounted both at the tractor and trailer if necessary.

The analyzer is controlled from front panel switches 96 mounted in the cab of tractor 11.

Each sensor is calibrated by comparing known loads with deflections of each sensor. Having calibrated the sensors, it is possible to measure differences in loads carried by each axle, so the load can be redistributed if necessary.

We claim:

1. For use in conjunction with a vehicle having a frame and a plurality of axles wherein each axle has a pair of springs, an improved weighing system comprising:

a pair of enclosed cylinder means mounted on each of said axles adjacent said springs and connected to said frame;

each of said enclosed cylinder means comprising two telescoping support tubes which slide vertically with respect to each other as said frame moves vertically with respect to said axles;

ultrasonic transducer means mounted inside one end of said enclosed cylinder means;

ultrasonic reflector means mounted inside the other end of said enclosed cylinder means;

temperature sensing means mounted inside said cylinder means; and circuit means for sequentially sensing the displacement of each of said transducer means relative to its corresponding reflector means, correcting for temperatures sensed in each of enclosed cylinder means, and integrating said displacement signals to correct for any inclined terrain on which the tractor-trailer stands when weighed.

2. The system of claim 1 further comprising weatherproof boot means connected at its ends to each of said telescoping support tubes.

3. The system of claim 1 further comprising control means mounted in the cab of said tractor for actuating said circuit means, and further comprising readout means for displaying the sensed weight of said tractor and trailer.

4. The system of claim 3 further comprising connecting cable means connecting each of said enclosed cylinder means to said control means wherein the connecting cable means is two coaxial cables.

* * * * *